United States Patent
Reddy et al.

(10) Patent No.: US 7,341,106 B2
(45) Date of Patent: Mar. 11, 2008

(54) METHODS FOR WELLBORE STRENGTHENING AND CONTROLLING FLUID CIRCULATION LOSS

(75) Inventors: B. Raghava Reddy, Duncan, OK (US); Mark R. Savery, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 214 days.

(21) Appl. No.: 11/186,192

(22) Filed: Jul. 21, 2005

(65) Prior Publication Data

US 2007/0017676 A1 Jan. 25, 2007

(51) Int. Cl.
*E21B 33/13* (2006.01)
*E21B 33/138* (2006.01)

(52) U.S. Cl. ............ 166/295; 166/277; 166/294; 166/300; 175/64; 175/72; 507/231; 507/266; 507/269; 507/910; 507/925

(58) Field of Classification Search ........ 507/910, 507/203, 219, 266, 269, 925; 166/270, 277, 166/292, 294, 295, 300; 175/64, 72
See application file for complete search history.

(56) References Cited

U.S. PATENT DOCUMENTS

| | | |
|---|---|---|
| 2,121,036 A | 6/1938 | Irons |
| 2,481,339 A | 9/1949 | Penfield |
| 2,697,071 A | 12/1954 | Kennedy et al. |
| 2,743,233 A | 4/1956 | Fisher |
| 2,801,967 A * | 8/1957 | Wilson ............... 507/103 |
| 3,158,210 A | 11/1964 | Cannon et al. |
| 3,267,174 A | 8/1966 | Fry et al. |
| 3,448,800 A | 6/1969 | Parker et al. |
| 3,640,675 A | 2/1972 | Thomas |
| 3,864,195 A | 2/1975 | Patterson |
| 3,996,177 A | 12/1976 | Ludwig |
| 4,308,184 A | 12/1981 | Thoma et al. |
| 4,390,658 A | 6/1983 | Graetz et al. |
| 4,391,643 A | 7/1983 | Murphey |
| 4,515,216 A | 5/1985 | Childs et al. |
| 4,526,240 A | 7/1985 | McKinley et al. |
| 4,537,918 A | 8/1985 | Parcevaux et al. |
| 4,633,950 A | 1/1987 | Delhommer et al. |

(Continued)

FOREIGN PATENT DOCUMENTS

WO WO 2006/053896 5/2006

OTHER PUBLICATIONS

Foreign communication from a related counterpart application dated Oct. 2, 2006.

(Continued)

*Primary Examiner*—George Suchfield
(74) *Attorney, Agent, or Firm*—Craig W. Roddy; Conley Rose, P.C.

(57) ABSTRACT

A sealant composition and methods for using the same are disclosed. In an embodiment, a method of servicing a wellbore in contact with a subterranean formation is disclosed. The method comprises placing a sealing agent and a nonaqueous carrier fluid in the wellbore. The method further comprises placing a nonaqueous activating fluid in the wellbore. In addition, the method comprises contacting the sealing agent with the nonaqueous activating fluid to form a sealant composition.

17 Claims, 2 Drawing Sheets

U.S. PATENT DOCUMENTS

| | | |
|---|---|---|
| 4,671,883 A | 6/1987 | Connell et al. |
| 4,704,213 A | 11/1987 | Delhommer et al. |
| 5,065,820 A | 11/1991 | Bloys et al. |
| 5,076,944 A * | 12/1991 | Cowan et al. .............. 507/104 |
| 5,091,448 A * | 2/1992 | Hostettler et al. ............ 524/45 |
| 5,159,980 A | 11/1992 | Onan et al. |
| 5,293,938 A | 3/1994 | Onan et al. |
| 5,295,543 A | 3/1994 | Terry et al. |
| 5,327,968 A | 7/1994 | Onan et al. |
| 5,364,012 A | 11/1994 | Davis et al. |
| 5,377,759 A | 1/1995 | Surles |
| 5,383,521 A | 1/1995 | Onan et al. |
| 5,458,195 A | 10/1995 | Totten et al. |
| 5,501,277 A | 3/1996 | Onan et al. |
| 5,569,324 A | 10/1996 | Totten et al. |
| 5,585,333 A | 12/1996 | Dahl et al. |
| 5,588,488 A | 12/1996 | Vijn et al. |
| 5,688,844 A | 11/1997 | Chatterji et al. |
| 5,711,383 A | 1/1998 | Terry et al. |
| 5,721,309 A | 2/1998 | Sharma et al. |
| 5,779,787 A | 7/1998 | Brothers et al. |
| 5,795,924 A | 8/1998 | Chatterji et al. |
| 5,800,911 A | 9/1998 | Sankey et al. |
| 5,823,273 A | 10/1998 | Ravi et al. |
| 5,913,364 A | 6/1999 | Sweatman |
| 5,921,319 A | 7/1999 | Curtice |
| 5,945,387 A | 8/1999 | Chatterji et al. |
| 5,964,293 A | 10/1999 | Chatterji et al. |
| 5,969,006 A | 10/1999 | Onan et al. |
| 6,017,854 A | 1/2000 | Van Slyke |
| 6,060,434 A | 5/2000 | Sweatman et al. |
| 6,098,711 A | 8/2000 | Chatterji et al. |
| 6,133,203 A | 10/2000 | Estes et al. |
| 6,138,759 A | 10/2000 | Chatterji et al. |
| 6,167,967 B1 | 1/2001 | Sweatman |
| 6,171,386 B1 | 1/2001 | Sabins |
| 6,196,315 B1 | 3/2001 | Surles et al. |
| 6,207,250 B1 | 3/2001 | Bullock et al. |
| 6,234,251 B1 | 5/2001 | Chatterji et al. |
| 6,258,757 B1 | 7/2001 | Sweatman et al. |
| 6,271,181 B1 | 8/2001 | Chatterji et al. |
| 6,312,515 B1 | 11/2001 | Barlet-Gouedard et al. |
| 6,315,042 B1 | 11/2001 | Griffith et al. |
| 6,328,106 B1 | 12/2001 | Griffith et al. |
| 6,330,917 B2 | 12/2001 | Chatterji et al. |
| 6,401,817 B1 | 6/2002 | Griffith et al. |
| 6,448,206 B1 | 9/2002 | Griffith et al. |
| 6,508,305 B1 | 1/2003 | Brannon et al. |
| 6,508,306 B1 | 1/2003 | Reddy et al. |
| 6,516,884 B1 | 2/2003 | Chatterji et al. |
| 6,518,224 B2 | 2/2003 | Wood |
| 6,524,384 B2 | 2/2003 | Griffith et al. |
| 6,555,507 B2 | 4/2003 | Chatterji et al. |
| 6,561,273 B2 | 5/2003 | Brothers et al. |
| 6,581,701 B2 | 6/2003 | Heying |
| 6,593,402 B2 | 7/2003 | Chatterji et al. |
| 6,641,660 B1 | 11/2003 | Chatterji et al. |
| 6,666,268 B2 | 12/2003 | Griffith et al. |
| 6,667,354 B1 * | 12/2003 | Fox et al. ..................... 524/35 |
| 6,668,928 B2 | 12/2003 | Brothers |
| 6,668,929 B2 | 12/2003 | Griffith et al. |
| 6,702,044 B2 | 3/2004 | Reddy et al. |
| 6,716,282 B2 | 4/2004 | Griffith et al. |
| 6,730,637 B1 | 5/2004 | Stewart et al. |
| 6,823,940 B2 | 11/2004 | Reddy et al. |
| 6,832,651 B2 | 12/2004 | Ravi et al. |
| 6,861,392 B2 | 3/2005 | Shaarpour |
| 6,881,708 B2 | 4/2005 | Reddy et al. |
| 6,887,833 B2 | 5/2005 | Brothers et al. |
| 6,902,002 B1 | 6/2005 | Chatterji et al. |
| 6,907,929 B2 | 6/2005 | Leroy-Delage et al. |
| 6,908,508 B2 | 6/2005 | Brothers |
| 2002/0010100 A1 | 1/2002 | Wood ......................... 507/100 |
| 2003/0230431 A1 | 12/2003 | Reddy et al. |
| 2003/0234102 A1 | 12/2003 | Brothers et al. |
| 2004/0167248 A1 | 8/2004 | Brothers et al. |
| 2004/0171499 A1 | 9/2004 | Ravi et al. |
| 2004/0180794 A1 | 9/2004 | Reddy et al. ............... 507/200 |
| 2004/0188091 A1 * | 9/2004 | Luke et al. ................. 166/291 |
| 2004/0194971 A1 | 10/2004 | Thomson .................... 166/387 |
| 2004/0221990 A1 | 11/2004 | Heathman et al. |
| 2005/0034866 A1 | 2/2005 | Brothers et al. |
| 2005/0034867 A1 | 2/2005 | Griffith et al. |
| 2005/0061505 A1 | 3/2005 | Caveny et al. |
| 2005/0113262 A1 | 5/2005 | Ravi et al. |
| 2005/0124502 A1 | 6/2005 | Shaarpour |

OTHER PUBLICATIONS

Halliburton brochure entitled "Bengum Squeeze Lost-Circulation Material" dated 2000.

Halliburton brochure entitled "Bentonite Cement Diesel Oil Slurry (BCDO) Lost-Circulation Material" dated 2000.

Halliburton brochure entitled "Cementing FlexPlug® OBM Lost-Circulation Material" dated 2004.

Halliburton brochure entitled "Cementing FlexPlug® W Lost-Circulation Material" dated 2004.

Halliburton brochure entitled "Flocele Lost-Circulation Additive" dated 1999.

Halliburton brochure entitled "Flo-Chek® Service Lost-Circulation Service" dated 2000.

Halliburton brochure entitled "Gilsonite Lost-Circulation Additive" dated 1999.

Halliburton brochure entitled "Granulite TR 1/4 Lost-Circulation Additive" dated 1999.

Halliburton brochure entitled "Tuf-Additive No. 2 Lost-Circulation Additive" dated 1999.

Rueda, Francisco et al., "In-Situ Reactive System Stops Lost Circulation and underground Flow Problems in Several Southers Mexico Wells" SPE 59059, dated 2000.

Sweatman, R. et al., "New Solutions for Subsalt-Well Lost Circulation and Optimized Primary Cementing", SPE 56499, dated 1999.

Sweatman, Ronald et al., "New Solutions to Remedy Lost Circulation, Crossflows, and Underground Blowouts" SPE/IADC 37671, dated 1997.

Sweatman, Ron et al., "New Fluids and Processes Stabilize Wellbores During Drillling Operations For Lower-Cost Well Construction and Enhanced Production" dated 1999.

* cited by examiner

METHODS FOR WELLBORE STRENGTHENING AND CONTROLLING FLUID CIRCULATION LOSS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to servicing a wellbore. More specifically, it relates to servicing a wellbore with a sealing agent that forms a sealant composition in the presence of a nonaqueous fluid.

2. Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation may be increased by hydraulically fracturing the formation. That is, a viscous fracturing fluid may be pumped down the casing to the formation at a rate and a pressure sufficient to form fractures that extend into the formation, providing additional pathways through which the oil or gas can flow to the well. Unfortunately, water rather than oil or gas may eventually be produced by the formation through the fractures therein. To provide for the production of more oil or gas, a fracturing fluid may again be pumped into the formation to form additional fractures therein. However, the previously used fractures first may need to be plugged to prevent the loss of the fracturing fluid into the formation via those fractures.

In addition to the fracturing fluid, other fluids used in servicing a wellbore such as drilling fluids may also be lost to the subterranean formation while circulating the fluids in the wellbore. For instance, the fluids may enter the subterranean formation via depleted zones, zones of relatively low pressure, loss circulation zones having naturally occurring fractures, weak zones having fracture gradients exceeded by the hydrostatic pressure of the drilling fluid, and so forth. The presence of alternative flow pathways in the subterranean formation may make the service provided by such fluids difficult to achieve. In addition, loss of fluids, such as oil-based muds may be quite expensive. Furthermore, the drilling operations may need to be interrupted until the circulation loss problem is solved, which may result in expensive idle rig time.

Formations that are sensitive to water, such as those containing swelling clay and shales, cannot be exposed to water-based fluids because of the potential for sloughing of the formation material into the wellbore. Consequently, such wellbores are typically drilled with oil-based drilling fluids, and loss circulation treatments in such zones may be devoid of any aqueous fluids.

Accordingly, a need exists to develop methods of blocking the flow of fluid through pathways such as fractures filled with water, loss circulation zones in the subterranean formation, voids or cracks in the cement column and the casing, and so forth. A need also exists for a method and composition for use in preventing loss circulation using nonaqueous drilling fluids.

BRIEF SUMMARY OF SOME OF THE PREFERRED EMBODIMENTS

These and other needs in the art are addressed in one embodiment by a method of servicing a wellbore. The method includes placing a sealing agent and nonaqueous carrier fluid in a subterranean formation. The method further includes placing a nonaqueous activating fluid in the wellbore that displaces at least a portion of the nonaqueous carrier fluid. In an embodiment, upon contacting the sealing agent, the nonaqueous activating fluid and sealing agent form a sealant composition suitable for blocking the flow of fluid through pathways such as fractures and loss circulation zones in the subterranean formation.

In another embodiment, needs in the art are addressed by a method of forming a sealant composition. The method includes placing a sealing agent and a nonaqueous carrier fluid in a subterranean formation. In an embodiment, the sealing agent is a thermoplastic elastomer. The method further includes displacing at least a portion of the nonaqueous carrier fluid with a nonaqueous activating fluid to form a sealant composition.

Needs in the art are addressed in another embodiment by a sealant composition that includes a sealing agent, a nonaqueous carrier fluid, and a nonaqueous activating fluid Introducing a sealing agent to a wellbore with a nonaqueous carrier fluid and contacting the sealing agent with a nonaqueous activating fluid overcomes problems in the art. For instance, unwanted premature swelling of the sealing agent is reduced. In addition, loss of nonaqueous fluids to a subterranean formation is mitigated.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
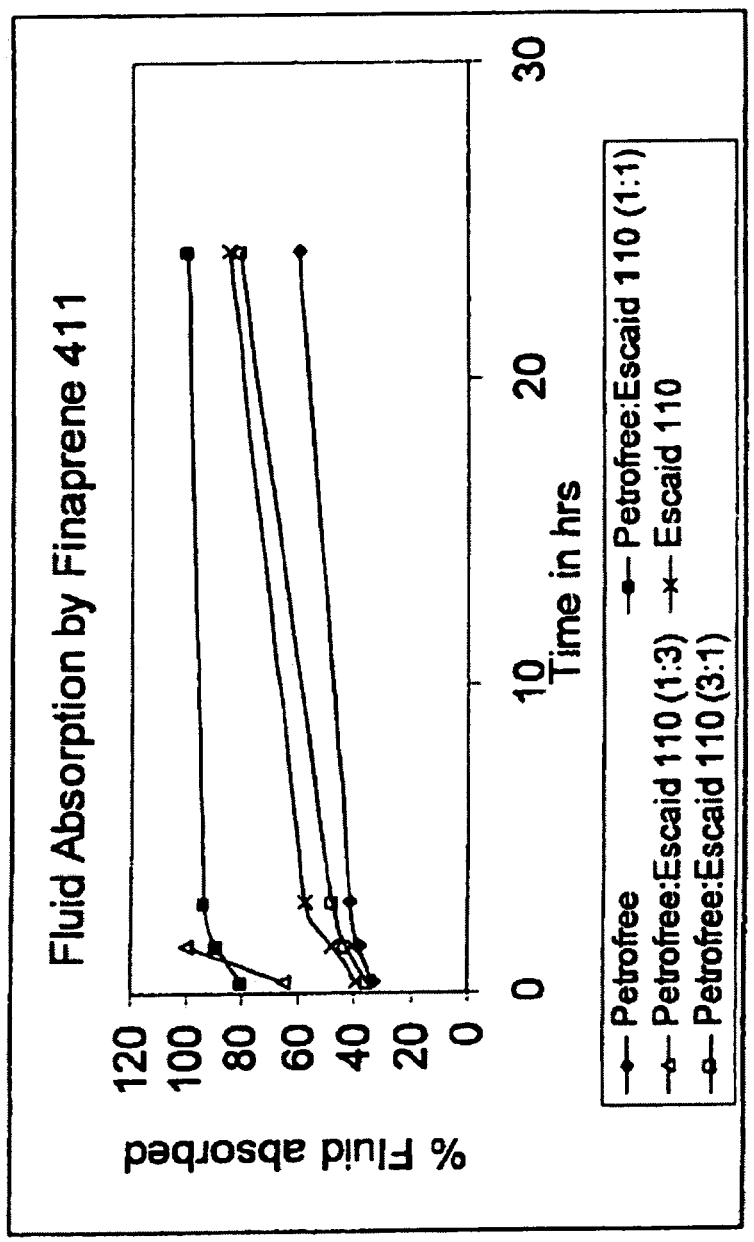
FIG. 1 is a graph illustrating a fluid absorption profile of an elastomer with activating fluids.

In an embodiment, a sealant composition comprises a sealing agent a nonaqueous activating fluid, and a nonaqueous carrier fluid. The sealing agent may be placed in a wellbore with the nonaqueous carrier fluid and activated by the nonaqueous activating fluid. The sealant composition is a mixture that can viscosify in wellbore zones where a fluid (e.g., drilling fluid) is being lost. For instance, the sealant composition may viscosify in a loss-circulation zone and thereby restore circulation. The viscosified mixture can set into a flexible, resilient and tough material, which may prevent further fluid losses when circulation is resumed. For instance, the sealant composition may withstand substantial amounts of pressure, e.g., the hydrostatic pressure of a drilling fluid or cement slurry, without being dislodged or extruded.

The sealant composition is for use in a wellbore that penetrates a subterranean formation. It is to be understood that "subterranean formation" encompasses both areas below exposed earth and areas below earth covered by water such as ocean or fresh water. The sealant composition can be used for any purpose. For instance, the sealant composition can be used to service the wellbore. Without limitation, servicing the wellbore includes positioning the sealant composition in the wellbore to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; and to seal an annulus between the wellbore and an expandable pipe or pipe string.

In an embodiment, the sealing agent is placed in a wellbore with a nonaqueous carrier fluid and activated by a nonaqueous activating fluid. A sealing agent refers to a material that, when exposed to a nonaqueous activating fluid, may exhibit an increase in viscosity. The sealing agent may be a polymer, homopolymer, copolymer or combinations thereof with a high capacity for fluid absorption. In some embodiments, the sealing agent may be a hydrophobic polymer, homopolymer, copolymer or combinations thereof. For instance, the sealing agent may be a thermoplastic elastomer (TPE). Without limitation, examples of suitable TPEs include dienes such as butadiene, isoprene and hexadiene and/or monoolefins such as ethylene, butenes, and 1-hexene. In an embodiment, the TPE includes polymers comprising aromatic hydrocarbon monomers and aliphatic dienes. Examples of suitable aromatic hydrocarbon monomers include without limitation styrene, alpha-methyl styrene and vinyltoluene. In an embodiment, the TPE is a crosslinked or partially crosslinked material. In an alternative embodiment, the sealing agent may be a styrene-butadiene random copolymer (SBS) having radial or linear polymer chain architecture. In another embodiment, the sealing agent may be a hydrogenated form of a SBS having radial or linear polymer chain architecture. Alternately, the sealing agent is a polyolefin grafted with polar monomers, for example maleic anhydride, sulfonic acid or sulfonate groups.

The sealing agent may be in any form suitable for placement in the wellbore. For instance, the sealing agent may be in a solid form (e.g., particles) or in the form of a liquid suspension. Without limitation, an example of a solid form is a desiccated solid form. The sealing agent may have any particle size suitable for forming the sealant composition and placement in a wellbore. In an embodiment, the sealing agent may have particle sizes from about 3.5 mesh to about 635 mesh, alternatively from about 18 mesh to about 400 mesh, and alternatively from about 35 mesh to about 200 mesh before it is exposed to fluid (i.e., in its solid form) Without wishing to be limited by theory, the use of a sealing agent of suitable particle size may provide a sealing agent that migrates deep (i.e. on the order of several inches to feet) into the subterranean formation to a zone of interest. Alternatively, the sealing agent may migrate only a short distance into the subterranean formation (i.e. on the order of fractions of an inch to a few inches) to a zone of interest.

Representative examples of suitable sealing agents include FINAPRENE 411, FINAPRENE 435, FINAPRENE 401 and FINACLEAR thermoplastic elastomers, which are SBS elastomers commercially available from Total Petrochemical USA, Inc. or as KRATON elastomers which are also SBS elastomers commercially available from Kraton Polymers. In an embodiment, the sealing agent (e.g., FINAPRENE 411 thermoplastic elastomer) has about the physical properties set forth in Table I.

TABLE I

| Property | FINAPRENE and other methods | Unit | Typical Value |
|---|---|---|---|
| Polymer type | | | SBS* |
| Structure | | | Radial |
| Physical appearance | | | Porous Crumb, Powder |
| Styrene/butadiene content | 1004 | % | 31/69 |
| Toluene solution viscosity | 1008 | mm$^2$/s | 28.5 |
| Density at 23° C. | 2602 | g/cm$^3$ | 0.94 |
| Oil content, phr | 1010 | | 0-5 |
| Melt flow rate 190° C./5 kg | 1006 | g/10 min | <0.5 |

*SBS = styrene butadiene block copolymer

The sealing agent may be placed in the wellbore with a sufficient amount of carrier fluid to provide a pumpable solution comprising the carrier fluid and sealing agent. The sealant agent may be present in the amount of from about 2 wt. % to about 50 wt. % of the carrier fluid, alternatively from about 10 wt. % to about 40 wt. % of the carrier fluid.

The carrier fluid may be a single fluid, a combination of fluids or a solution of a solid in a nonaqueous solvent. The carrier fluid may be any nonaqueous fluid that is chemically incompatible or partially incompatible with the sealing agent and suitable for providing a pumpable slurry. In an embodiment, the sealing agent is insoluble in the carrier fluid. A suitable carrier fluid may prevent, minimize, or delay the fluid absorption into the sealing agent while being transported to the subterranean zone of interest. Suitable carrier fluids may be described as those fluids that adsorb less than 5% by weight of the sealing agent at conditions including room temperature over a period of one hour. Examples of suitable carrier fluids include but are not limited to alcohols such as octanol, butanol, isopropanol, methanol and ethanol; alcohol ethers, for example reaction products of alcohols and not more than 3 moles of ethylene oxide; linear paraffins; esters or combinations thereof. Examples of alcohol ethers include without limitation, ethyleneglycol, monomethyl ether and diethyleneglycol methyl ether. Alternatively, the carrier fluid is a mixture of an aliphatic hydrocarbon such as internal olefins, linear alpha olefins, poly alpha olefins, diesel, mineral oil, kerosene or combinations thereof with an alcohol such as those described previously. The compatibility of the carrier fluid and sealing agent may be adjusted by the combination of two or more solvents to provide suitable absorption (e.g., less than 5% by weight of the sealing agent).

Exposure of the sealing agent to the nonaqueous carrier fluid may provide substantially no swelling or fusion of the sealing agent or may only cause partial swelling and/or fusion of the sealing agent while still maintaining the composition as a pumpable slurry. In an embodiment, exposure of the sealing agent to a nonaqueous carrier fluid may cause the volume of the sealing agent to increase from about 0 to about 25 percent of its original volume, alternatively from about 0 to about 10% of its original volume, and alternatively from about 0 to about 5% of its original volume.

The activating fluid may be a nonaqueous fluid that is suitable for forming the sealant composition and for use in a wellbore. Suitable activating fluids include without limitation internal olefins; linear alpha olefins; poly alpha olefins; diesel; mineral oil; kerosene; esters; ethers; linear paraffins; aromatic hydrocarbons such as toluene and xylenes; cyclic aliphatic hydrocarbons such as cycloalkanes and high napthenic content hydrocarbons; ketones such as acetone and methyl ethyl ketone; halogenated hydrocarbons such as methylene chloride and ethylene dichloride; nonaqueous solutions of polymers such as polystyrene and atactic polyolefins; or combinations thereof. The activating fluid may be placed into the wellbore by any means suitable for the introduction of a fluid to a subterranean formation. For instance, the activating fluid may be pumped into the wellbore prior to, concurrently with and/or after the sealing agent and nonaqueous carrier fluid.

In an embodiment, an activating fluid may be placed in a wellbore and contacted with the sealing agent to swell the sealing agent and/or cause fusion of the particles of the sealing agent. A suitable amount of activating fluid may be placed in the wellbore to contact the sealing agent and cause the particles of the sealing agent to swell and/or fuse. In an embodiment, the activating fluid is introduced to the wellbore in an amount comprising at least about 25% by volume of the carrier fluid, alternatively at least about 50% by volume of the carrier fluid. In an embodiment, the activating fluid displaces at least a portion of the carrier fluid.

Without wishing to be limited by theory, the activating fluid may cause the particles of the sealing agent to form the sealant composition, which may provide a barrier that can be effective for blocking flow paths of the well fluid into the subterranean formation. A barrier as described herein refers to a substantially single uniform mass produced when the sealing agent has absorbed an activating fluid and fused. The physical characteristics of this embodiment may be an intact, solid mass with no flow properties, substantial flexibility, and/or high resiliency, or the ability to rebound back to about normal volume after exposure and subsequent relief of a compressive force.

A representative example of a suitable activating fluid includes without limitation ESCAID 110 hydrocarbon fluid with is a petroleum distillate commercially available from EXXON-MOBIL Corp. In an embodiment, the activating fluid (e.g., ESCAID 110 hydrocarbon fluid) has about the physical properties set forth in Table II.

TABLE II

| Property | Test Methods | Sales Specifications |
|---|---|---|
| Aniline Point (° C.) | ASTM D 611 | 65.6 min |
| Appearance | Visual | Pass |
| Aromatics Content, (wt %) | AM-S 140.31 | 0.5 max |
| Color, (Saybolt units) | ASTM D 156 | 30 min |
| Distillation | ASTM D 86 | |
| IBP, (° C.) | | 200 min |
| DP, (° C.) | | 248 max |
| Flash Point, (° C.) | ASTM D 93 | 77.0 min |
| Pour Point, (° C.) | ASTM D 97 | −35 max |
| Specific Gravity @ 15.6/15.6° C. | ASTM D 4052 | 0.790–0.810 |
| Viscosity @ 40° C., (cSt) | ASTM D 445 | 1.3–1.9 |

It is to be understood that the amount, rate and extent to which the activating fluid causes the sealing agent to fuse and/or increase in size may vary depending upon the activating fluid and subterranean environment. A swollen and/or fused sealing agent may substantially seal fractures, fissures voids and the like in the subterranean formation through which the well fluid may otherwise pass, thus inhibiting the well fluid from exiting the subterranean formation in an unintended direction. As a result, fluids may be circulated in the wellbore for the purpose of servicing the wellbore without being lost to the formation.

When contacted with the activating fluid, the sealant composition is formed by the sealing agent increasing in size (e.g., swelling) and/or the sealing agent particles fusing together. The sealing agent may swell by its absorption of the activating fluid. The sealing agent may have any amount of swelling suitable for forming the sealant composition. In an embodiment, the sealing agent may swell from about 25% to about 600% of its original volume, alternatively from about 25% to about 200% of its original volume. It is to be understood that such an increase in swelling includes swelling caused by the activating fluid as well as any partial swelling caused by the nonaqueous carrier fluid or other mechanism.

In an embodiment, the sealing agent, when contacted with an activating fluid, may swell and remain as a discrete particulate mass. In another embodiment, the sealing agent, when contacted with an activating fluid, forms a single rubbery mass without significant swelling (i.e., less than about 25% increase in volume). In yet another embodiment, the sealing agent, when contacted with an activating fluid forms a single mass of swollen rubbery material.

The combination of sealing agent and nonaqueous activating fluids, either as a single component fluid or as a combination of two or more components, can be selected to produce differing sealant conformations. Depending on the combination of sealing agent and nonaqueous activating fluid, the resulting sealant composition may form a single rubbery mass without significant swelling, a single rubbery mass with some swelling, or a swollen mass of discrete, rubbery particulate composition. The combinations which form a single rubbery mass without significant swelling include those having a nonaqueous carrier fluid that rapidly dissolves the surface layers of the sealing agent and which when dissolved fuse or fuse under pressure. Nonaqueous carrier fluids which solvate only selected portions of the polymer segments of the sealing agent due to their compatibility with the chemical nature of the segments, but do not solvate other segments of the polymer chain may cause sealing agent swelling without fusing or forming a single mass. For example, a solvent system can be chosen such that it solvates only the butadiene derived segments of a SBS. Such solvents do not affect the styrene-derived segments of the polymer. The unsolvated styrene segments may act as cross-linked portions of a network allowing the material to swell without forming a solution. Fluid systems with properties in between the above two limits can be designed to form a single swollen rubbery mass when contacted with the sealing agent at downhole conditions. Alternatively, fluid systems with properties in between the above two limits can be designed to form a single swollen rubbery mass at formation temperatures and pressures. For example, an aliphatic hydrocarbon solvent such as ESCAID 110 hydrocarbon fluid may primarily interact with the butadiene portion of an SBS and cause the butadiene segments to swell leaving the styrene segments unaffected, which may result in a sealant composition that is a single swollen rubbery mass.

The swell and/or fuse time of the sealing agent in contact with a nonaqueous activating fluid may be from less than about 5 hours to about 24 hours, alternatively in a range of from less than about 1 hour to about 4 hours.

The sealant composition can further comprise additives for improving or changing its properties. Examples of suitable additives include fluid absorbing materials, particulate materials, superabsorbers for aqueous fluids, viscosifying agents, suspending aids, dispersing agents, density-adjusting materials or combinations thereof. In an embodiment, the sealant composition may form a non-flowing, intact mass inside the loss-circulation zone. This mass plugs the zone and inhibits loss of subsequently pumped drilling fluid, which allows for further drilling. It is to be understood that the drilling fluid may include a nonaqueous fluid such as a diesel, a mineral oil, an internal olefin, a linear alpha-olefin, an ester, or combinations thereof. In an embodiment, a nonaqueous drilling fluid is the activating fluid.

In an embodiment, the sealing agent and carrier fluid are placed into a wellbore followed by displacement of activating fluid into the wellbore or vice versa. Alternatively, the activating fluid is placed into the wellbore at about the same time as the carrier fluid. The carrier fluid with the sealing agent and the activating fluid are allowed to mix downhole at a desired location and form the sealant composition. Methods for introducing compositions into a wellbore to seal subterranean zones are described in U.S. Pat. Nos. 5,913,364; 6,167,967; and 6,258,757, which are incorporated by reference herein in their entirety.

In an embodiment, the sealant composition is introduced to the wellbore to prevent the loss of aqueous or nonaqueous drilling fluids into loss-circulation zones such as voids, vugular zones, and natural or induced fractures while drilling. It is to be understood that drilling fluid includes any suitable drilling fluid such as oil based, water-based, water, and the like. The sealing agent and carrier fluid are pumped into the wellbore separately from the activating fluid and allowed to mix with the activating fluid downhole near the loss-circulation zone. When the activating fluid and sealing agent contact each other at downhole conditions, the activating fluid may cause the sealing agent particles to swell and/or fuse and thereby form a mixture of increased viscosity. In one embodiment, it may be desired to hasten the viscosification reaction for swift plugging of the voids. In another embodiment, it may be desired to prolong or delay the viscosification for deeper penetration into the voids. The sealant composition is formed and provides a relatively viscous mass inside the loss-circulation zone. The sealant composition can also form a non-flowing, intact mass inside the loss-circulation zone. This mass plugs the zone and inhibits loss of subsequently pumped drilling fluid, which allows for further drilling. Additives can also be added to the carrier fluid and pumped into the wellbore with the activating fluid. For instance, fluid absorbing materials, particulate materials, resins, superabsorbers for aqueous fluids, viscosifying agents, suspending aids, dispersing agents, density-adjusting materials or combinations thereof can be pumped with the drilling fluid and activation fluid. Viscosifying agents, dispersing agents, or both, can also be introduced to the wellbore with the sealing agent and carrier fluid.

In an embodiment, the sealant compositions that include a sealing agent and activating fluid may be employed in well completion operations such as primary and secondary cementing operations. In such an embodiment, the sealing agent with carrier fluid and activating fluid are introduced to the wellbore in the same flowpath. The sealing agent and activating fluid can be introduced sequentially (e.g., to prevent premature sealing agent viscosification) or together into the wellbore. In one embodiment, the sealing agent with carrier fluid is pumped through the drill pipe followed by a spacer fluid such as weighted, viscosified aqueous fluid or weighted nonaqueous fluid. The activating fluid is then pumped through the drill pipe. Alternatively, the activating fluid with carrier fluid can be pumped first followed by the sealing agent. In primary cementing, such a sealant composition may be placed into an annulus of the wellbore and allowed to set such that it isolates the subterranean formation from a different portion of the wellbore. The sealant composition thus forms a barrier that prevents fluids in that subterranean formation from migrating into other subterranean formations. Within the annulus, the sealant composition also serves to support a conduit, e.g., casing, in the wellbore.

In an embodiment, the wellbore in which the sealant composition is positioned belongs to a multilateral wellbore configuration. It is to be understood that a multilateral wellbore configuration includes at least two principal wellbores connected by one or more ancillary wellbores. In secondary cementing, often referred to as squeeze cementing, the sealant composition may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth. Various procedures that may be followed to use a sealant composition in a wellbore are described in U.S. Pat. Nos. 5,346,012 and 5,588,488, which are incorporated by reference herein in their entirety.

In another embodiment, the sealant composition containing sealing agent and activating fluid but no cementitious material may be used in well completion operations such as primary operations. In such an embodiment, the sealing agent and activating fluid are introduced to the wellbore in the same stream. The sealing agent and activating fluid can be introduced sequentially or together into the wellbore. As an example, they may be placed behind expandable casings or used for consolidating gravel packs or incompetent formations. Further, such sealant compositions may be used in remedial operations such as sealing leaks, cracks, or voids and forming temporary plugs for the purpose of isolating zones to divert subsequent fluids and the like. Additional disclosure regarding the use of cementless sealant compositions for such applications can be found in U.S. Pat. Nos. 5,159,980 and 6,668,928, which are incorporated by reference herein in their entirety.

In other embodiments, additives are also pumped into the wellbore with the sealing agent and carrier fluid and/or activating fluid. For instance, fluid absorbing materials, particulate materials, resins, aqueous superabsorbers, viscosifying agents, suspending agents, dispersing agents, or combinations thereof can be pumped in the stream with the sealing agent and/or activation fluid.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example I

Fluid absorption studies were conducted using FINAPRENE 411 elastomer as the sealing agent. Four mixtures were prepared each having of 5 grams of FINAPRENE 411 elastomer and 50 ml of nonaqueous fluid. The nonaqueous fluids were PETROFREE organic carrier fluid, which is an organic ester-based fluid available from Baroid Drilling Fluids, ESCAID 110 hydrocarbon fluid and octanol. The mixtures were incubated at room temperature for 24 hours and then heated for 1 hour.

Figure 2:
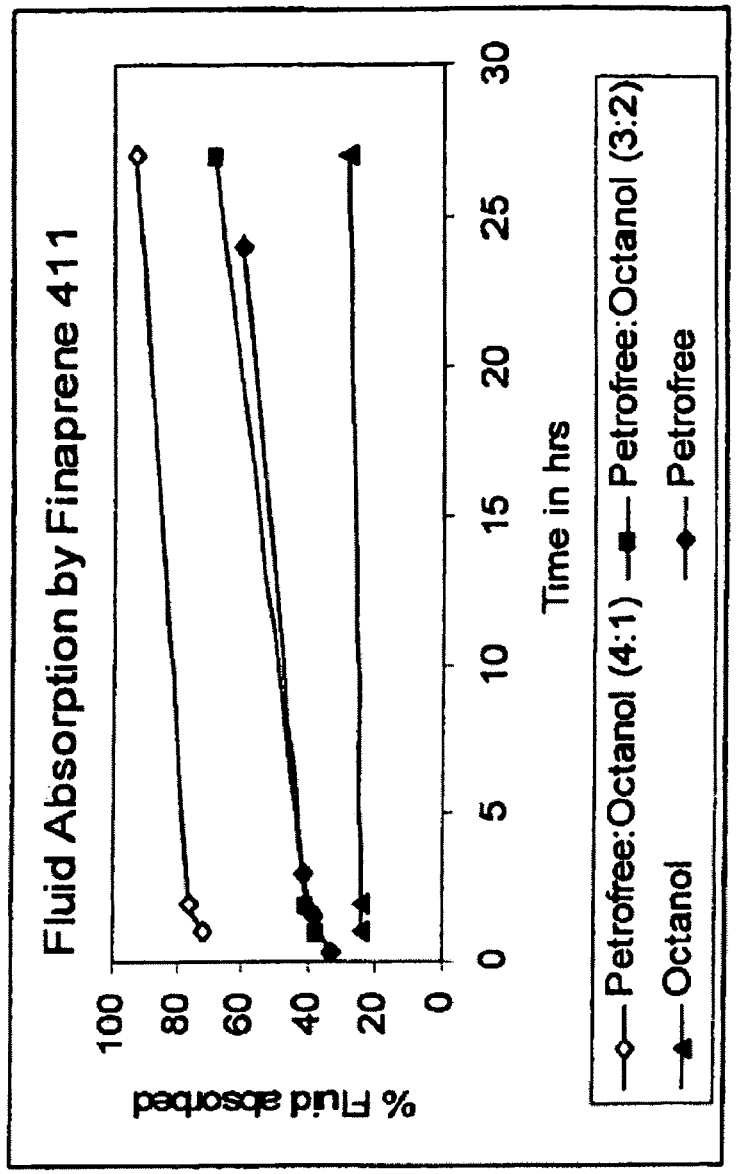
FIG. 2 is also a graph illustrating a fluid absorption profile of an elastomer with activating fluids.

The rate of fluid absorption by FINAPRENE 411 elastomer was measured by pouring out or filtering the fluid at periodic intervals through a No. 8 mesh screen and the results are as shown in FIGS. 1 and 2. The filtrate weight was then determined. FIGS. 1 and 2 are graphs of the percent fluid absorbed by FINAPRENE 411 elastomer as a function of time for the indicated nonaqueous fluids. FIGS. 1 and 2 demonstrate that the fluid absorption levels and as a result, the swelling rates of FINAPRENE 411 elastomer, can be controlled by using suitable nonaqueous carrier and activating fluids. Additionally, the results demonstrate that in nonaqueous fluids containing octanol, the fluid absorption of FINAPRENE 411 elastomer is reduced compared to the fluid absorption observed in fluids containing ESCAID 110 hydrocarbon fluid. Octanol also controls absorption of the organic carrier PETROFREE organic carrier fluid. Therefore, octanol and the combinations of octanol with PETROFREE organic carrier fluid can be used as carrier fluids during placement of the swelling agent. The carrier fluid can then be displaced with an activating fluid such as PETROFREE organic carrier fluid or ESCAID 110 hydrocarbon fluid or any suitable combination of these fluids.

Example II

The ability of FINAPRENE 411 elastomer to form a uniform rubbery mass when contacted with PETROFREE organic carrier fluid or ESCAID 110 hydrocarbon fluid or any suitable combination of these fluids was also observed. A mixture of 5 grams of FINAPRENE 411 elastomer and 50 ml of nonaqueous fluid was incubated at room temperature for 24 hours. The mixture was then heated at 140° F. for 1 hour in a water bath. Table III shows the observed conformation changes of the indicated sealing agent, which is a thermoplastic elastomer, as a function of nonaqueous fluid, time and temperature.

TABLE III

| Fluid System | Observations |
| --- | --- |
| PETROFREE organic carrier fluid | Viscous pourable fluid, the thermoplastic elastomer dissolved in fluid |
| PETROFREE organic carrier fluid: ESCAID 110 hydrocarbon fluid (1:1) | Viscous pourable fluid, the thermoplastic elastomer dissolved in fluid |
| PETROFREE organic carrier fluid: ESCAID 110 hydrocarbon fluid (1:3) | Viscous pourable fluid, the thermoplastic elastomer dissolved in fluid |
| PETROFREE organic carrier fluid: ESCAID 110 hydrocarbon fluid (3:1) | Viscous pourable fluid, the thermoplastic elastomer dissolved in fluid |
| ESCAID 110 hydrocarbon fluid | Single block of highly resilient rubber solid-no fluidity |

From the observed results, it is shown that the desired final physical state of the rubbery mass capable of preventing circulation losses of well treatment fluids can be designed by screening of fluids with different polarities and chemical composition for use in combination with a chosen thermoplastic elastomer.

Example III

Changes in the sealing agent conformation were observed when 5 g of TPE was incubated with 50 ml of nonaqueous fluid. The mixtures were left at room temperature for the time periods indicated in Table IV. The mixture was then heated at 140° F. for 1 hour in a water bath. Referring to Table IV, the changes in the sealing agent conformation were determined for the thermoplastic elastomers FINAPRENE 401 elastomer, FINAPRENE 502 elastomer and FINAPRENE 416 elastomer using PETROFREE organic carrier fluid, ESCAID 110 hydrocarbon fluid and combinations of PETROFREE organic carrier fluid and ESCAID 110 hydrocarbon fluid as activating fluids.

The observations given in Table IV demonstrate that the final physical state adopted by the sealing agent and fluid mixtures in situ depend on polymer structure, fluid composition and temperature. These mixtures can develop into stiff, rubbery and highly elastic materials that may prevent circulation loss and improve formation strength.

TABLE IV

| TPE | Fluid | Observations |
| --- | --- | --- |
| FINAPRENE 401 elastomer | PETROFREE organic carrier fluid | 40% Fluid absorption in 90 min at room temperature<br>Two fluid layers after heating<br>* Top layer thin fluid; bottom layer viscous polymer rich fluid |
| FINAPRENE 401 elastomer | PETROFREE organic carrier fluid: ESCAID | 42% Fluid absorption in 90 min at room temperature<br>Two fluid layers after heating |

TABLE IV-continued

| TPE | Fluid | Observations |
| --- | --- | --- |
| | 110 hydrocarbon fluid (3:1) | * Top layer thin fluid; bottom layer viscous polymer rich fluid |
| FINAPRENE 401 elastomer | PETROFREE organic carrier fluid: ESCAID 110 hydrocarbon fluid (1:1) | 49% Fluid absorption in 90 min at room temperature<br>Two fluid layers after heating<br>* Top layer thin fluid; bottom layer viscous polymer rich fluid |
| FINAPRENE 401 elastomer | PETROFREE organic carrier fluid: ESCAID 110 hydrocarbon fluid (1:3) | 69% Fluid absorption in 90 min at room temperature<br>Two fluid layers after heating<br>* Top layer thin fluid; bottom layer viscous polymer rich fluid |
| FINAPRENE 401 elastomer | ESCAID 110 hydrocarbon fluid | 100% absorption in 30 minutes and formed a stiff, resilient rubbery mass<br>Upon heating, the entire rubbery mass became a homogeneous fluid, which solidified again upon cooling to form a stiff rubbery mass. |
| FINAPRENE 502 elastomer | PETROFREE organic carrier fluid | 35% Fluid absorption in 40 min at room temperature<br>Two fluid layers after heating<br>* Top layer thin fluid; bottom layer viscous polymer rich fluid |
| FINAPRENE 502 elastomer | ESCAID 110 hydrocarbon fluid | 100% absorption in 30 minutes and formed a stiff, resilient rubbery mass<br>Upon heating, the entire rubbery mass became a homogeneous fluid, which solidified again upon cooling to form a stiff rubbery mass. |
| FINAPRENE 416 elastomer | PETROFREE organic carrier fluid | 22% Fluid absorption in 60 min at room temperature<br>Two fluid layers after heating<br>* Top layer thin fluid; bottom layer viscous polymer rich fluid |
| FINAPRENE 416 elastomer | ESCAID 110 hydrocarbon fluid | 66% absorption in 60 min at room temperature, particles stuck to each other<br>Upon heating, swollen particulate mass floated on a thin fluid. |

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in contact with a subterranean formation, comprising: placing a sealing agent and a nonaqueous carrier fluid in the wellbore; placing a nonaqueous activating fluid in the wellbore; and contacting the sealing agent with the nonaqueous activating fluid to form a sealant composition, wherein the sealing agent is a thermoplastic elastomer and wherein the sealing agent increases in volume from about 0 to about 25% when exposed to the nonaqueous carrier fluid and increases in volume from about 25 to about 600% of its original volume when exposed to the nonaqueous activating fluid.

2. The method of claim 1, wherein the sealing agent is a polymer, a homopolymer, a copolymer, or combinations thereof.

3. The method of claim 2, wherein the sealing agent is hydrophobic.

4. The method of claim 1, wherein the sealing agent is a styrenebutadiene random copolymer.

5. The method of claim 4 wherein the styrene butadiene random copolymer is in a hydrogenated form.

6. The method of claim 1, wherein the sealing agent comprises particle sizes from about 3.5 mesh to about 635 mesh.

7. The method of claim 1, wherein the sealing agent is present when placed in the wellbore in an amount of from about 2 percent to about 50 percent by weight of the carrier fluid.

8. The method of claim 1, wherein the nonaqueous carrier fluid comprises a compound selected from the group consisting of an alcohol, an alcohol ether, a linear paraffin, an ester and combinations thereof.

9. The method of claim 1, wherein the nonaqueous activating fluid comprises a compound selected from the group consisting of an internal olefin, a linear alpha olefin, a poly alpha olefin, a diesel, a mineral oil, a kerosene, an ester, an ether, a linear paraffin, an aromatic hydrocarbon, a cyclic aliphatic hydrocarbon, a ketone, a halogenated hydrocarbons, a nonaqueous polymer solution and combinations thereof.

10. The method of claim 1, wherein the nonaqueous activating fluid is placed in the wellbore in an amount comprising at least about 25 percent by volume of the carrier fluid.

11. The method of claim 1, wherein the sealing agent comprises particles, and wherein the sealant composition is formed by fusion of the particles.

12. The method of claim 1 wherein the sealant composition functions to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof.

13. The method of claim 1 wherein the thermoplastic elastomer comprises a compound selected from the group consisting of a diene; isoprene and hexadiene; monoolefins; polymers comprising aromatic hydrocarbon monomers and aliphatic dienes; and combinations thereof.

14. The method of claim 1 wherein the sealing agent comprises a polyolefin grafted with polar monomers.

15. The method of claim 1 wherein the sealing agent has a swell time of less than about 5 hours.

16. The method of claim 1 wherein the sealing agent is insoluble in the carrier fluid.

17. A method of forming a sealant composition, comprising: placing a sealing agent and a nonaqueous carrier fluid into a subterranean formation and displacing at least a portion of the nonaqueous carrier fluid with a nonaqueous activating fluid to form the sealant composition, wherein the sealing agent is it thermoplastic elastomer and wherein the sealing agent increases in volume from about 0 to about 25% when exposed to the nonaqueous carrier fluid and increases in volume from about 25 to about 600% of its original volume when exposed to the nonaqueous activating fluid.

* * * * *